(12) United States Patent
Harel et al.

(10) Patent No.: US 10,222,480 B2
(45) Date of Patent: Mar. 5, 2019

(54) METHODS AND DEVICES FOR COMPENSATING MISADJUSTMENT OF A GNSS DEVICE

(71) Applicant: Intel Corporation, Santa Clara, CA (US)

(72) Inventors: Ran Harel, Ramla (IL); Tomer Dahan, Modiin (IL)

(73) Assignee: Intel Corporation, Santa Clara, CA (US)

( * ) Notice: Subject to any disclaimer, the term of this patent is extended or adjusted under 35 U.S.C. 154(b) by 321 days.

(21) Appl. No.: 15/282,601

(22) Filed: Sep. 30, 2016

(65) Prior Publication Data

US 2018/0095178 A1    Apr. 5, 2018

(51) Int. Cl.
*H04B 1/7085*    (2011.01)
*G01S 19/23*    (2010.01)
*G01S 19/26*    (2010.01)
*G01S 19/29*    (2010.01)

(52) U.S. Cl.
CPC ............ *G01S 19/235* (2013.01); *G01S 19/26* (2013.01); *G01S 19/29* (2013.01)

(58) Field of Classification Search
CPC .... H04L 2027/0069; H04L 2027/0026; H04B 1/7085; H04B 1/7075; H04B 1/70706
USPC ................. 375/326, 327, 371, 373
See application file for complete search history.

(56) References Cited

U.S. PATENT DOCUMENTS

| 5,983,160 | A | 11/1999 | Horslund et al. | |
| 6,850,557 | B1 | 2/2005 | Gronemeyer | |
| 2007/0258366 | A1* | 11/2007 | Imamura | H04L 5/0046 370/230 |
| 2011/0103359 | A1* | 5/2011 | Cho | H04W 76/10 370/338 |
| 2011/0227614 | A1* | 9/2011 | Anandakumar | G01S 19/235 327/156 |
| 2013/0113647 | A1 | 5/2013 | Sentelle et al. | |
| 2013/0271318 | A1 | 10/2013 | Doucet et al. | |

OTHER PUBLICATIONS

Search Report dated May 19, 2018 for International Application No. PCT/US17/50470.

* cited by examiner

*Primary Examiner* — Kevin Kim
(74) *Attorney, Agent, or Firm* — Schiff Hardin LLP

(57) ABSTRACT

This disclosure relates to a control device for compensating misadjustment of a tunable code loop filter of a portable global navigation satellite system (GNSS) device due to movement of the GNSS device, the control device comprising: a waveform estimator configured to estimate a signal-to-noise ratio (SNR) waveform based on an SNR of a radio signal received by the GNSS device; and a controller configured to tune the code loop filter based on the estimated SNR waveform to compensate for misadjustment of the code loop filter due to movement of the GNSS device.

25 Claims, 7 Drawing Sheets

400

METHODS AND DEVICES FOR COMPENSATING MISADJUSTMENT OF A GNSS DEVICE

FIELD

The disclosure relates to a method and a device for compensating misadjustment of a tunable code loop filter of a portable global navigation satellite system (GNSS) device due to movement of the GNSS device, in particular due to swinging arm antenna movement when the GNSS device is carried by a running, walking or standing pedestrian user, e.g. by using a handstrap.

BACKGROUND

A hand strapped or carried GNSS device 101 used by a walking user 103, e.g. as shown in FIG. 1 presents a challenge to a GNSS Measurement engine (ME) because the antenna movements 102 cause a pattern of cyclic loss of power with periodic intervals of increased and reduced SNR levels. This is mainly due to the inherent directionality of the antenna and the fact that while the user is walking or running, his hand periodically changes the angle relative to the sky. This signal behaviour can cause up to 10 dB Hz jumps in the received signal 106, 107, and results in degraded search and tracking of satellite vehicles (SVs) 104, 105 over time. Typically the ME drops SVs because of sudden power drops or in general performs worse due to the short intervals of low SNRs. The problem is aggravated in tough urban conditions, where the signal can have a significant SNR degradation in the first place, and bad antenna angles (even if instantaneous) can bring it to be absolutely invisible. GNSS SVs searching and tracking especially in low power level signals (<20 dB Hz) will have vast performance degradations as the mechanisms work in continuous periods which can last for several seconds (non-coherent integrations) and SNR drops in within these periods will result in very poor GNSS receiver performance and user experience.

There is a need to find a solution for improving the detection performance of a GNSS device in the above described scenarios of antenna movements, in particular caused by a pedestrian user carrying the GNSS device.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
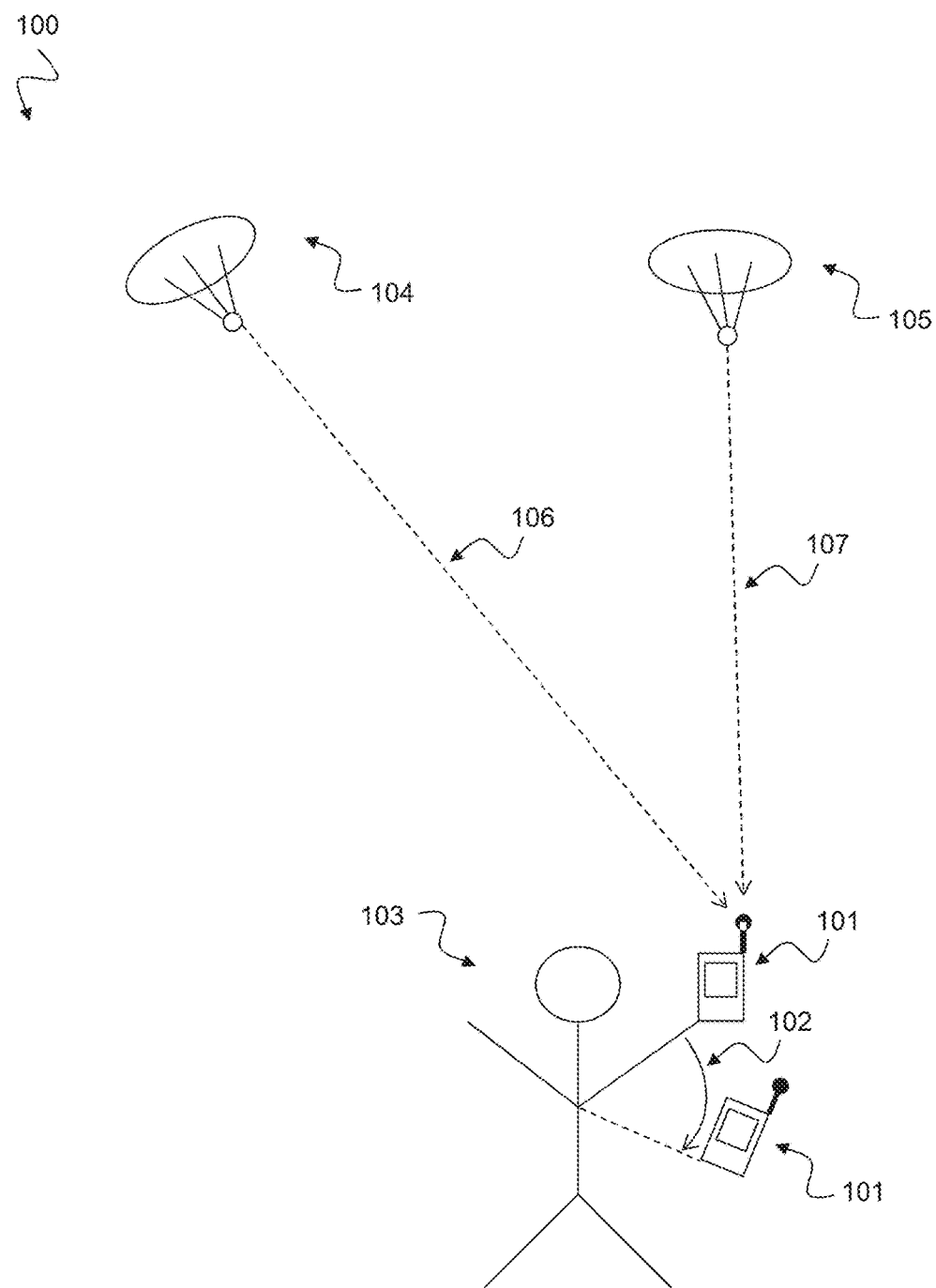
FIG. 1 is a schematic diagram of a GNSS system 100 with a GNSS device 101 carried by a pedestrian user 103.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
GNSS: global navigation satellite system
ME: Measurement Engine (of GNSS device)
SV: Satellite Vehicle
SNR: Signal-to-Noise Ratio
EKF: Extended Kalman Filter
FFT: Fast Fourier Transform The methods and devices according to the disclosure relate to global navigation satellite system (GNSS) devices and methods and devices for controlling GNSS devices. A satellite navigation system is a system that uses satellites also referred to as satellite vehicles to provide autonomous qeo-spatial positioning. It allows satellite navigation receivers to determine their location (longitude, latitude, and altitude/elevation) to high precision (within a few meters) using time signals transmitted along a line of sight by radio from satellites. The system can be used for navigation or for tracking the position of the satellite navigation device fitted with a satellite navigation receiver (satellite tracking). The signals also allow the electronic receiver to calculate the current local time to high precision, which allows time synchronization. A satellite navigation system with global coverage is termed hereinafter a global navigation satellite system (GNSS).

The methods and devices according to the disclosure may be based on dead reckoning. In navigation, dead reckoning is the process of calculating one current position by using a previously determined position, or fix, and advancing that position based upon known or estimated speeds over elapsed time and course. Dead reckoning also means the process of estimating the value of any variable quantity by using an earlier value and adding whatever changes have occurred in the meantime. Often, this usage implies that the charges are not known accurately. The earlier value and the changes may be measured or calculated quantities.

The disclosed methods and devices described hereinafter are based on anticipating or predicting the cyclic nature of the SNR loss of a hand strapped/carried GNSS receiver, and thus take advantage of the quick recovery of the SNR following a drop period and exploit summing measurements (such as in in-coherent integration or ME Code loop) related to excessive noise periods (when antenna is down). For searching and qualifying low level signals which involves long integration periods, e.g. longer than 500 milliseconds, the disclosed methods and devices improve SVs detection. (providing some SVs have already been captured, and the SNR pattern can be inferred) as described hereinafter. Methods and devices according to the disclosure support intermittent search capabilities.

The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals and performing associated signal processing. Radio signals may be or may include radio frequency signals radiated by a radio transmitting device (or radio transmitter or sender) with a radio frequency lying in a range of about 3 kHz to 300 GHz. The frequency range may correspond to frequencies of alternating current electrical signals used to produce and detect radio waves.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

Figure 2:
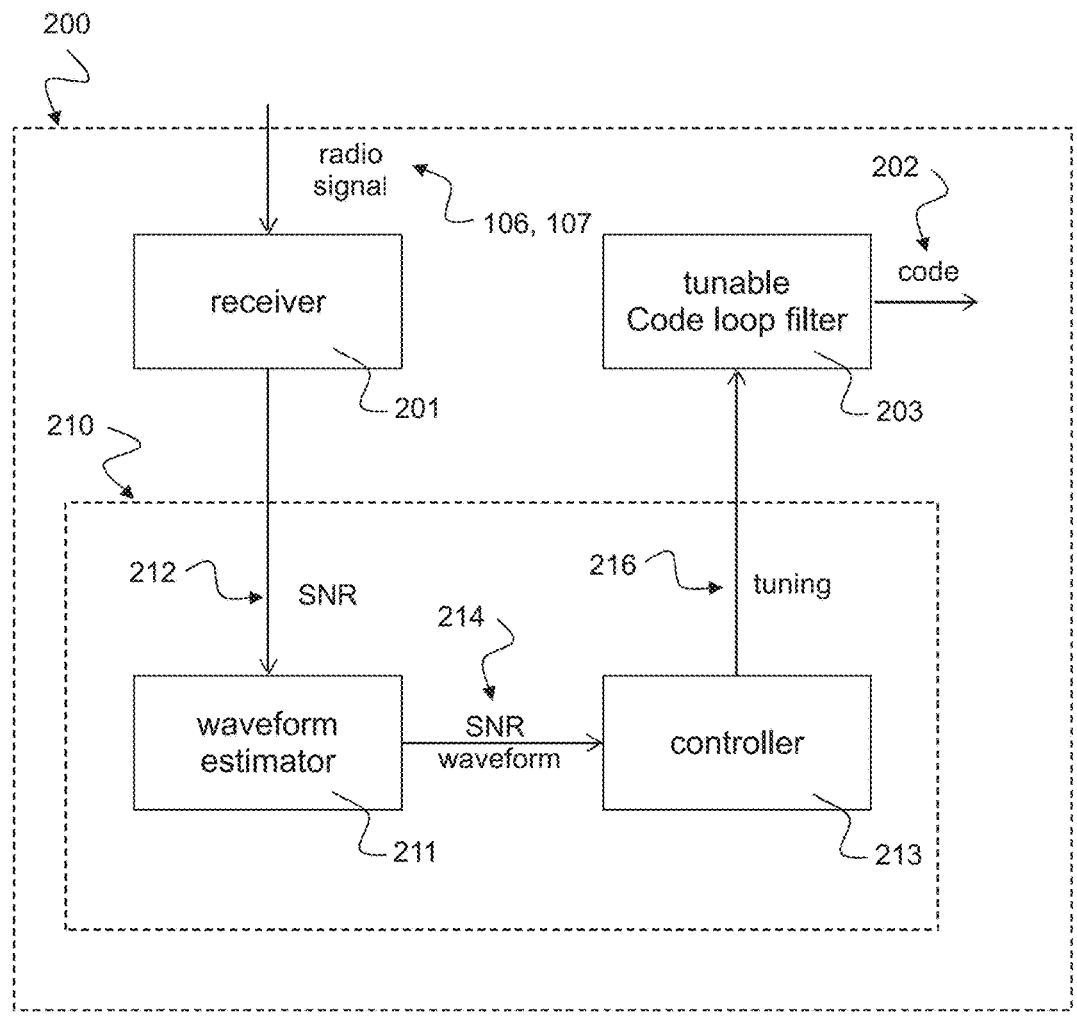
FIG. 2 is a block diagram of a control device 210 for compensating misadjustment of a tunable code loop filter 203 of a portable GNSS device 200 according to a first implementation.

FIG. 2 is a block diagram of a control device 210 for compensating misadjustment of a tunable code loop filter 203 of a portable GNSS device 200 due to movement of the GNSS device 200 according to a first implementation. The control device 210 includes a waveform estimator 211 and a controller 213.

The waveform estimator 211 is configured to estimate a signal-to-noise ratio (SNR) waveform 214 based on an SNR 212 of a radio signal 106, 107 received 201 by the GNSS device 200. The controller 213 is configured to tune 216 the code loop filter 203 based on the estimated SNR waveform 214 to compensate for misadjustment of the code loop filter 203 due to movement of the GNSS device 200. The SNR waveform 214 may be characterized by SNR waveform parameters such as a cycle time and amplitude of the SNR waveform. In the following estimating the SNR waveform 214 means estimating the waveform parameters which characterize the SNR waveform.

In particular, the waveform estimator 211 may estimate the SNR waveform 214 based on determining at least one of the cycle time and the amplitude of the SNR 212.

The waveform estimator may determine the cycle time and the amplitude of the SNR 212 based on a time series of the SNR. The cycle time and the amplitude of the SNR may be for example determined based on Kalman filtering or based on Short Term Fourier filtering, e.g. Short Term Fast Fourier Transform (FFT) filtering.

The control device 210 may include a user profile detector configured to detect a user profile of a user of the GNSS device 200 based on the estimated SNR waveform 214. The user profile detector may detect the user profile based on threshold detection of the estimated SNR waveform 214 with respect to a set of given motion patterns, e.g. predetermined motion patterns stored in a memory, each one representing a different motion scenario of the user, e.g. as described below with respect to FIG. 3. The set of given motion patterns may include patterns representing at least one of the following user motions of a pedestrian user of the GNSS device: running, walking, standing. The user profile detector may detect the user profile based on threshold detection of the determined cycle time of the SNR with respect to a set of given arm swift durations representing the different user motions of the pedestrian user, e.g. as described below with respect to FIG. 3.

The controller 213 may be configured to tune the code loop filter 203 based on adjusting loop gain factors of the code loop filter 203, e.g. as described below with respect to FIG. 3. For example, the loop gain factors may include a first loop gain factor $K_1$ weighting a previous code result, a second loop gain factor $K_2$ weighting a current Doppler measurement value and a third loop gain factor $K_3$ weighting a current code result. The code loop filter 203 may include a second order model for representing the code loop gain according to the equation: $Code_{[n]}=K_1*Code_{[n-1]}+K_2*Doppler_{[n]}*\Delta T +K_3*Code_{[n]}$, e.g. as described below with respect to FIG. 3, where $Code_{[n]}$ is the current C/A code discriminator result; $Code_{[n-1]}$ is the previous C/A code estimate of the loop 203; $Doppler_{[n]}$ is the current Doppler measurement. The first loop gain factor $K_1$ and the second loop gain factor $K_2$ are associated with the prediction part of the C/A code loop filter 203, while the third loop gain factor $K_3$ is associated with the current C/A code estimate.

The controller 213 may be configured to detect a low SNR interval if the SNR 212 is below a predetermined threshold. The controller 213 may be configured to reduce the weighting of the third first loop gain factor with respect to a weighting of the first and second first loop gain factors if a low SNR interval is detected, e.g. as described below with respect to FIG. 3. The controller 213 may be configured to restrain the GNSS device from dropping a signal contribution of a satellite vehicle in the received radio signal and to keep the GNSS device perform tracking via dead reckoning if a low SNR interval is detected, e.g. as described below with respect to FIG. 3. The controller 213 may be configured to restrain the GNSS device from incoherent integration of the radio signal if a low SNR interval is detected, e.g. as described below with respect to FIG. 3. The controller 213 may be configured to adjust the first loop gain factor versus the second loop gain factor in accordance with the detected user profile if a low SNR interval is detected, e.g. as described below with respect to FIG. 3.

The controller 213 may be an internal or integral part of the GNSS device 200 (as shown in FIG. 2) or may be implemented as an external component (not shown in FIG. 2).

In the following an exemplary functionality of the control device 210 is described. A hand strapped/carried GNSS device—displays a cyclic and predictable SNR pattern over time. A reasonable motion model is that a user persists in his walking/running state for a long duration (e.g. a couple of minutes)—i.e. long enough to detect the profile of the SNR change over time, which is the amplitude and the cycle time.

There are many ways to estimate cycle time and amplitude of a time series. Some implementation examples are described below with respect to FIG. 3. The estimated cycle and amplitude can be used in a variety of ways to improve performance of the hand strapped/carried device as described hereinafter.

The estimated cycle time and amplitude can be used to predict ahead the intervals of lower SNR (when the antenna is down), and instruct the ME loop and ME engines control mechanisms to give more weight to Code loop dead reckoning, rather than updating the code loop with recent noisy measurements. Code loop dead reckoning means—Doppler interpolation of the code loop.

In long incoherent integrations which are long enough, to contain a full arm swing duration, it is possible to disable summing over the coherent integrations or the square thereof which belong to the lower SNR intervals (the ones which antenna points downwards). This will results in summing over of only useful integration results rather than one which contributes to noise.

In extreme cases the SNR shifts may cause ME to drop entirely an SV. By predicting the cycle it is possible to tell if the SNR drop is short term and ME is anticipated to recover signal strength soon, so this knowledge can be used to restrain the ME decision making to drop the SV. It can also help searching algorithms to use high signal level periods in non-continuous integration mode, providing some SVs has already been captured, and the SNR pattern can be inferred.

A user profile can be inferred or detected—e.g. identifying a Running/Walking/Standing state of a user, and process noise can be tuned in more confidence and to be better suited in the PE KF.

In the same manner the ME can adjust its loop filter gain, to allow for the different user dynamics.

Figure 3:
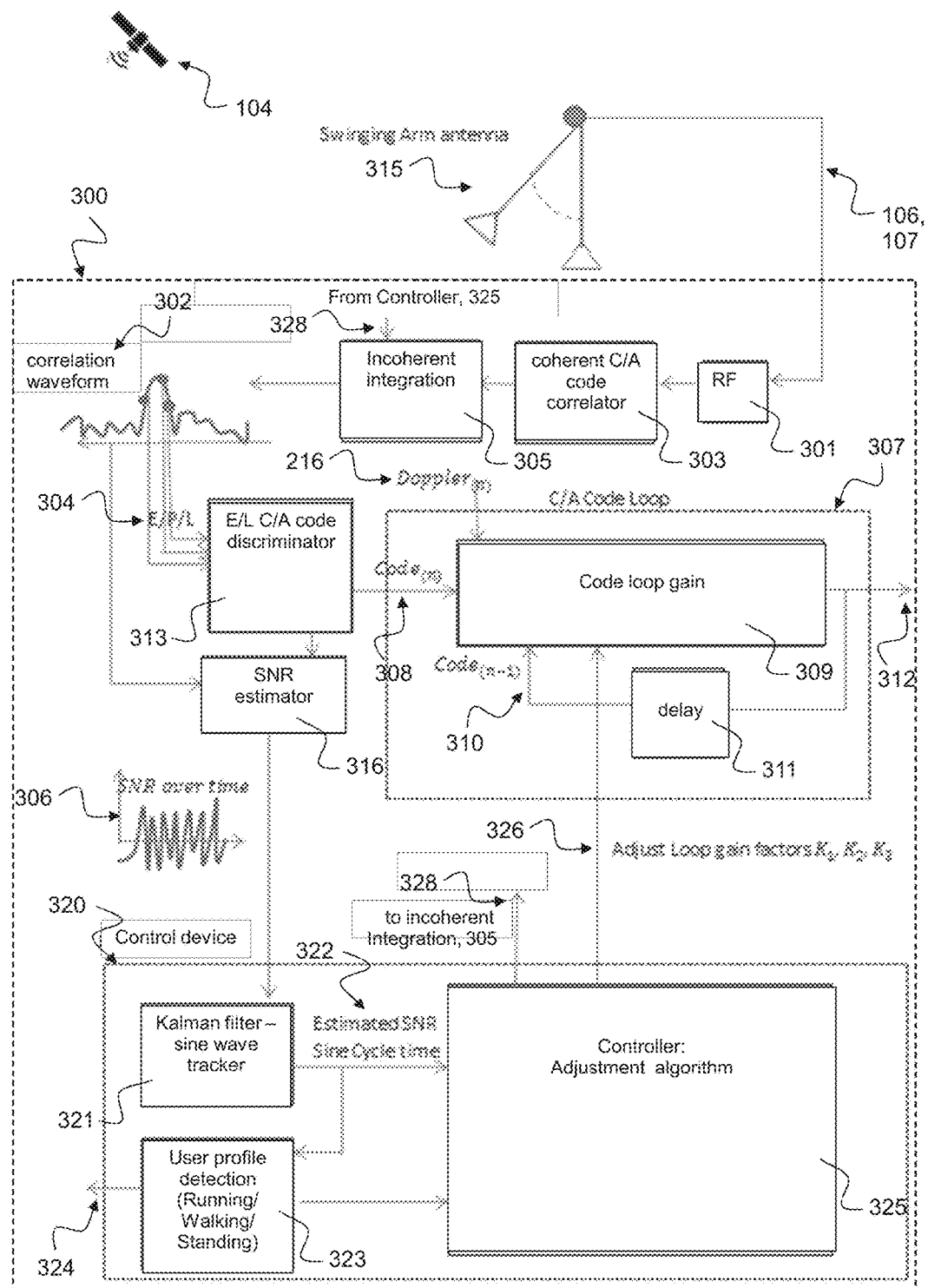
FIG. 3 is a block diagram of a control device 320 for compensating misadjustment of a tunable code loop filter 307 of a portable GNSS device 300 according to a second implementation.

FIG. 3 is a block diagram of a control device 320 for compensating misadjustment of a tunable code loop filter 307 of a portable GNSS device 300 according to a second implementation. The control device 320 is a specific implementation of the control device 210 described above with respect to FIG. 2. The control device 320 includes a waveform estimator 321 implemented by a Kalman filter and a controller 325 processing an adjustment algorithm. Additionally a user profile detector 323 is included in the control device 320 for detecting a state of the user such as running, walking or standing.

The waveform estimator 321 is configured to estimate a signal-to-noise ratio (SNR) waveform 322 based on an SNR 306 of a radio signal received 301 by the GNSS device 300. The controller 325 is configured to tune 326 the code loop filter 307 based on the estimated SNR waveform 322 to compensate for misadjustment of the code loop filter 307 due to movement of the GNSS device 300. The SNR waveform 322 may be characterized by SNR waveform parameters such as cycle time and amplitude which are determined by the waveform estimator 321.

The controller 325 may additionally use a user profile detected by the user profile detector 323 to adjust the code loop filter 307. The controller 325 may be an internal or integral part of the GNSS device 300 (as shown in FIG. 3) or may be implemented as an external component (not shown in FIG. 3).

The GNSS device 300 includes a radio frequency (RF) circuit 301 for receiving a radio signal from a swinging arm antenna 315 which receives signals from one or preferably more satellite vehicles. A coherent C/A code correlator 303 is coupled to the RF circuit 303 for performing a coherent (C/A) code correlation based on the received radio signal. An incoherent integration block 305 is coupled to the coherent C/A code correlator 303 for performing an incoherent integration or accumulation of the output signal of the coherent C/A code correlator 303 to provide a correlation waveform 302.

The GNSS device 300 includes an E/L C/A code discriminator 313 to discriminate E/P/L parameters from the correlation waveform 302. GNSS device 300 includes an SNR estimator 316 to determine or estimate a signal-to-noise ratio (SNR) 306 over time based on the correlation waveform 302 or based on the received radio signal 106, 107.

The GNSS device 300 includes a tunable (C/A) code loop filter 307 which includes a code loop gain 309, e.g. according to a second order model, in a feed-forward path of the loop filter 307 and a delay element 311, e.g. implementing a unit delay, in a feedback path of the loop filter 307. The tunable (C/A) code loop filter 307 may implement the following filter function: $Code_{[n]} = K_1 * Code_{[n-1]} + K_2 * Doppler_{[n]} * \Delta T + K_3 * Code_{[n]}$, where $Code_{[n]}$ is the current C/A code discriminator result; $Code_{[n-1]}$ is the previous C/A code estimate of the loop; $Doppler_{[n]}$ is the current Doppler measurement, $K_1$ is the first loop gain factor, $K_2$ is the second loop gain factor and $K_3$ is the third loop gain factor.

In one implementation, the controller 325 may adjust the three loop gain factors $K_1$, $K_2$ and $K_3$ based on the following adjustment algorithm:

If this is an expected low SNR interval (i.e. the SNR 306 is below a predetermined threshold indicating a low SNR interval): (a) give more weight to $K_1$ and $K_2$ and de-weight $K_3$ to allow more dead-reckoning. (b) Do not drop the SV if tracking. (c) in long in-coherent integrations greater than one second, do not sum over (square of) coherent integration results.

In the following, an exemplary implementation of the functionality of the control device 320 is described.

The new mechanism (for adjusting the C/A code loop) includes: (1) An EKF (Enhanced Kalman Filter) 321 to track the SNR sine wave and estimate the cycle and amplitude of the SNR waveform 306 over time. (2) A threshold detector 323 to detect possible different user profiles 324, by comparing the estimated SNR cycle times 322 to typical arm swing durations of walking/running/standing users.

Once it is determined with some confidence the user is either walking or running—an algorithm to infer if the receiver is within the low SNR or high SNR part of the cycle, and accordingly, if this is a low SNR period as predicted by the filter do the following operations:

(a) Use more the dead reckoning part of the loop filter 307 to predict the next code sample, on expense of the new C/A code measurement. This is effectively done by tuning the gain filter parameters K1, K2, K3 in the following way (decreasing K3 relative to K1 and K2): The Loop gain is computed by factoring Doppler propagation of the previous C/A code and the current C/A Code measurement: $Code_{est} = K_1 * Code_{(n-1)} + K_2 * Doppler_{(n)} * \Delta T + K_3 * Code_{(n)}$, where Code (n) is the current C/A Code discriminator result; Code(n-1) is the previous C/A Code estimate of the loop; Doppler(n) is the current Doppler measurement; K1 and K2 are associated with the prediction part of the C/A code Loop filter; and K3 is associated with the current C/A Code estimate.

(b) Restrain ME decision making from dropping the SV, and keep tracking via dead reckoning, because it Is likely to reappear soon.

(c) For long incoherent integration which are bigger than 1 second and include a full arm swing motion, sum over only coherent integration results which are within the high SNR period. This allows removal of excess noise periods when there is no useful/good signal which occurs during low pointing antenna intervals.

(d) By adjusting K1 versus K2 it is possible to tune the filter process noise, to reflect the innovation in the user motion, in accordance to the profile detection of running walking or standing states of the user.

In one implementation the ME SNR estimator 316 can produce estimates in high rate (e.g. 10 per second), this allows tracking SNR changes that reflect the motion of the user hand tilting over time. There are many ways to estimate cycle time and amplitude of a time series. In one implementation, cycle time and amplitude are estimated by an EKF (Enhance Kalman filter) that can track a sine wave and output the estimated cycle and amplitude. By selecting a proper process noise, the filter factors in the possible changes in the cycle time, including the user become stationary and the cycle become infinite. In another implementation, cycle time and amplitude are estimated by Short term FFTs (e.g. Sliding window FFTs).

Since all SVs experience the SNR jitter in unison, in one implementation all the (SV) channels are combined to estimate a single cycle time for all channels.

In field tests it was observed that the different satellite vehicles (SVs) 104, 105 display strong correlation in the SNR over time fluctuation pattern, due to the fact that when the antenna is angled away from the sky all SVs experience power loss at the antenna. This correlation is illustrated in FIGS. 4 and 5 described below.

Figure 4:
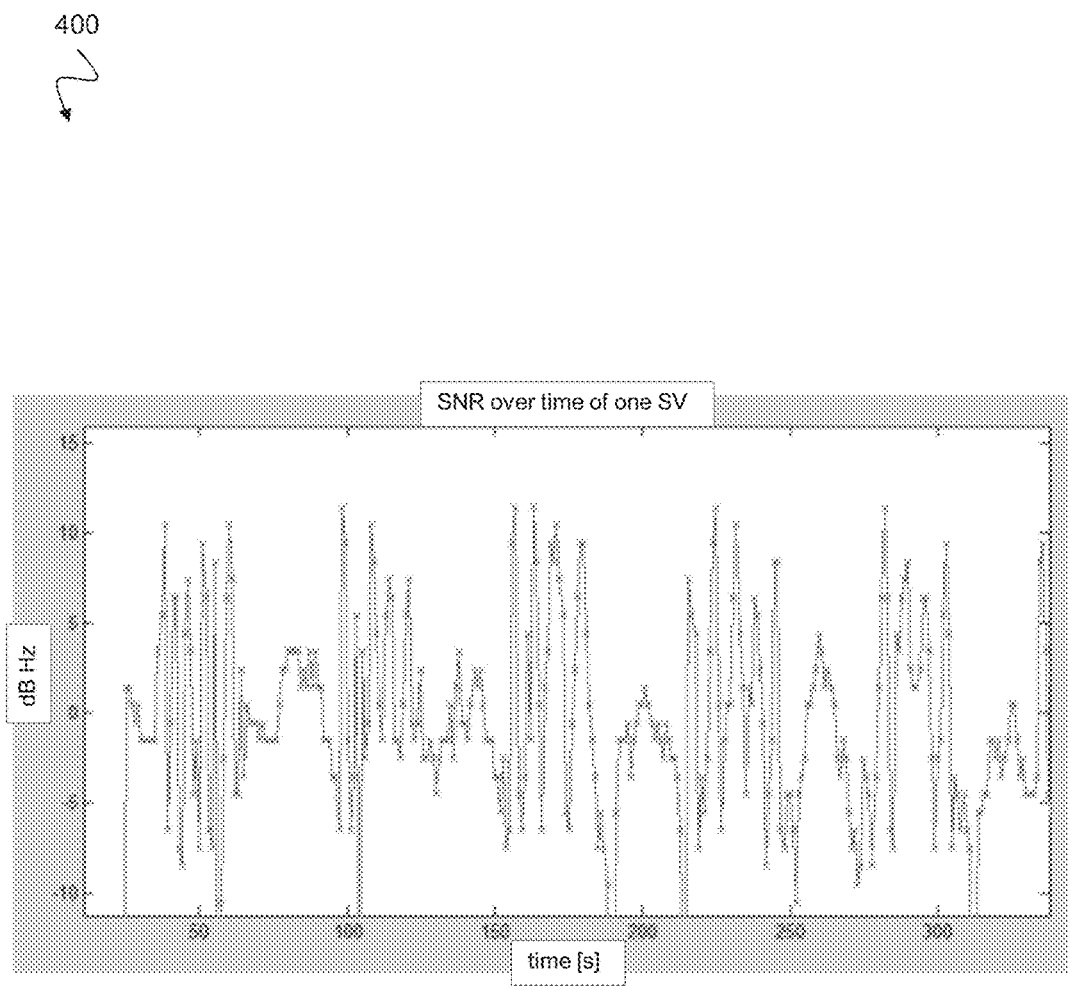
FIG. 4 is an exemplary signal-to-noise ratio (SNR) record 400 of the signal contribution from a first SV in a GNSS radio signal.
Figure 5:
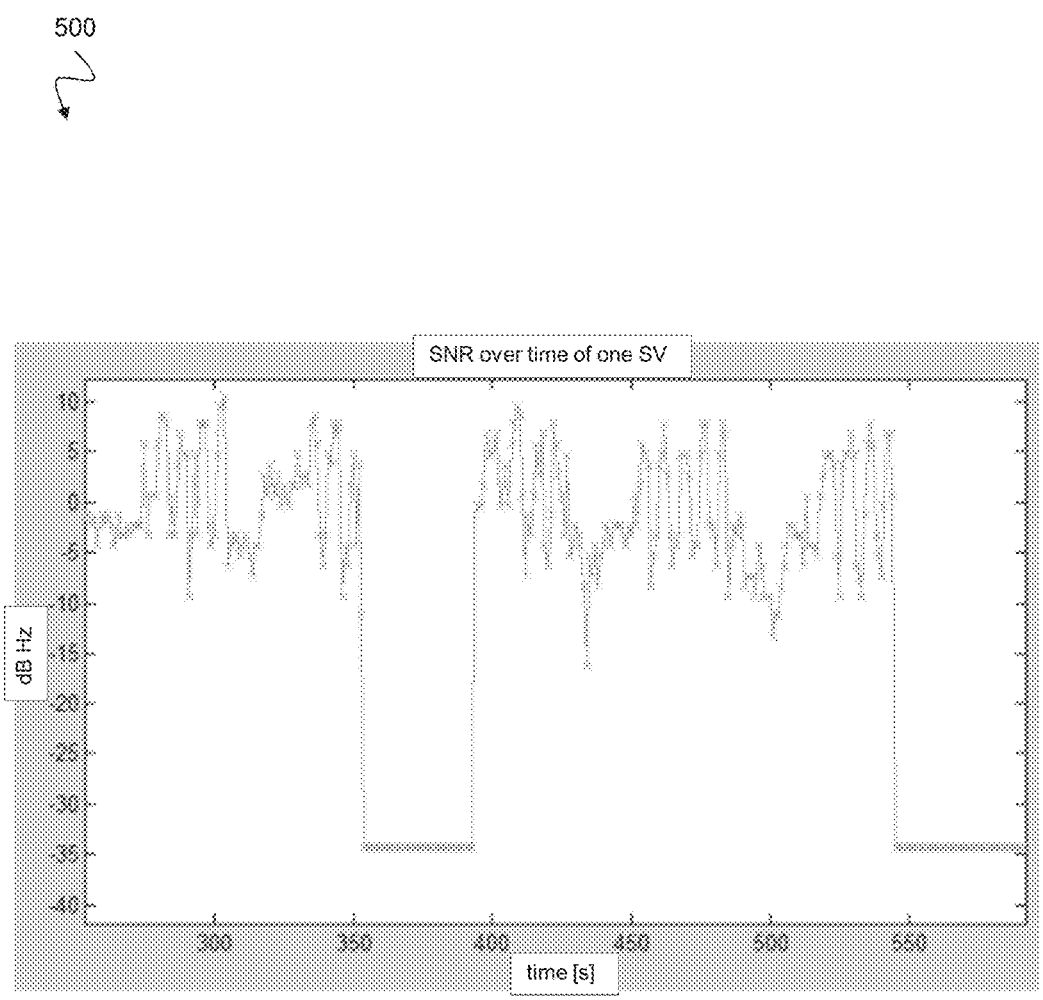
FIG. 5 is an exemplary signal-to-noise ratio (SNR) record 500 of the signal contribution from a second SV in a GNSS radio signal, recorded from the same run as the record 400 shown in FIG. 4.

FIG. 4 is an exemplary signal-to-noise ratio (SNR) record 400 of the signal contribution from a first SV in a GNSS radio signal.

The SNR record 400 is from actual field tests, conducted for a user which alternates between walking 30 seconds and standing 30 seconds. The SNR (dB Hz) is de-biased to show only transitions around zero.

The visible SNR jitter periods correspond to the 30 seconds walking intervals interlaced with 30 second standing periods.

Note that the cycle time of the SNR is around 5 seconds, which is much higher than the arm swing cycle time. This is due to aliasing occurring because the SNR is sampled at 1 second intervals, and the user arm is swinging at approximately the same rate, so the recorded SNR oscillation is aliased and appears to be slower than one Hz.

If the SNR samples were to be produced at fast rate (e.g. 5-10 per second), the above graph in FIG. 4 is likely to show the real arm swing cycle time, and the effect seen in FIG. 4 will be much more pronounced and less noisy.

FIG. 5 is an exemplary signal-to-noise ratio (SNR) record 500 of the signal contribution from a second SV in a GNSS radio signal, recorded from the same run as the record 400 shown in FIG. 4.

The record 500 shown in FIG. 5 is from the same run as the record 400 shown in FIG. 4 but for a different SV. Overlayed together both records 400, 500 will show same correlation in the SNR changes.

The graph 500 also exhibits a possible loss of tracking at about 350 seconds, due to the negative effect of the arm swing.

Figure 6:
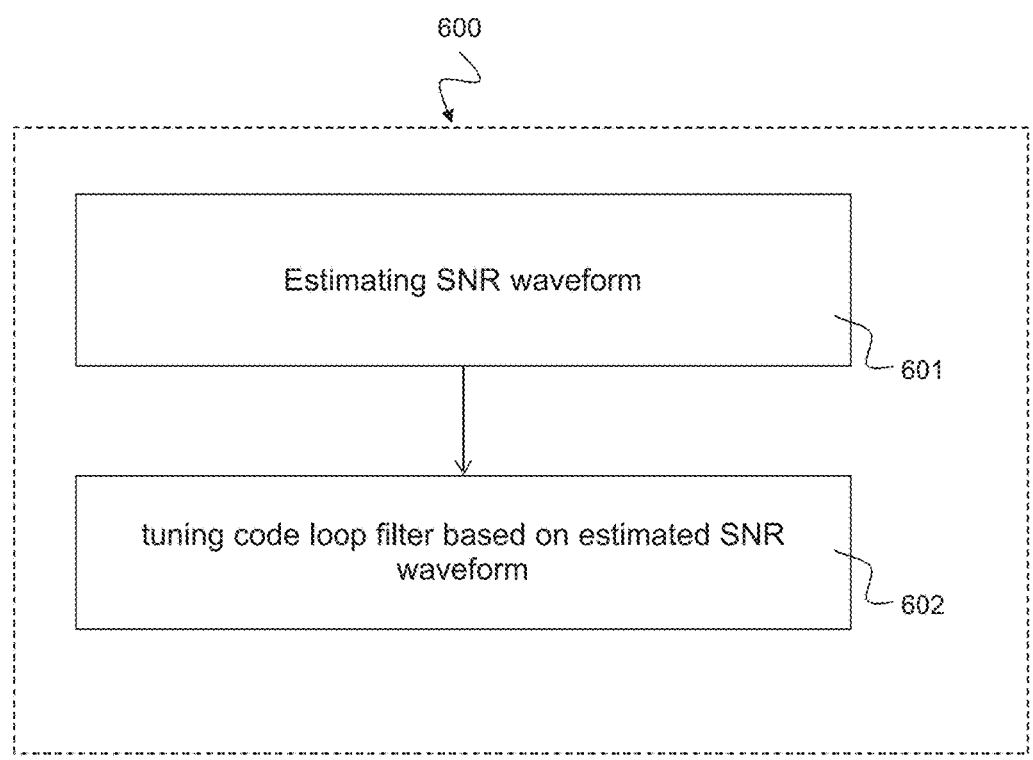
FIG. 6 is a schematic diagram illustrating a method 600 for compensating misadjustment of a tunable code loop filter of a portable GNSS device according to the disclosure.

FIG. 6 is a schematic diagram illustrating a method 600 for compensating misadjustment of a tunable code loop filter of a portable GNSS device due to movement of the GNSS device according to the disclosure.

The method 600 includes: estimating 601 a signal-to-noise ratio (SNR) waveform based on an SNR of a radio signal received by the GNSS device, e.g. according to the functionality of the waveform estimator 211 described above with respect to FIG. 2. The method 600 includes: tuning 602 the code loop filter based on the estimated SNR waveform to compensate for misadjustment of the code loop filter due to movement of the GNSS device, e.g. according to the functionality of the controller 213 described above with respect to FIG. 2.

The method 600 may include estimating the SNR waveform based on determining a cycle time and an amplitude of the SNR. The method 600 may include determining the cycle time and the amplitude of the SNR based on a time series of the SNR. The method 600 may include determining the cycle time and the amplitude of the SNR based on Kalman filtering. The method 600 may include determining the cycle time and the amplitude of the SNR based on Short Term Fourier filtering. The method 600 may include detecting a user profile of a user of the GNSS device based on the estimated SNR waveform. The method 600 may include detecting the user profile based on threshold detection of the estimated SNR waveform with respect to a set of given motion patterns, each one representing a different motion scenario of the user. The set of given motion patterns may include patterns representing at least one of the following user motions of a pedestrian user of the GNSS device: running, walking, standing. The method 600 may include detecting the user profile based on threshold detection of the determined cycle time of the SNR with respect to a set of given arm swift durations representing the different user motions of the pedestrian user. The method 600 may include tuning the code loop filter based on adjusting loop gain factors of the code loop filter. The loop gain factors may include a first loop gain factor weighting a previous code result, a second loop gain factor weighting a current Doppler measurement value and a third loop gain factor weighting a current code result.

Figure 7:
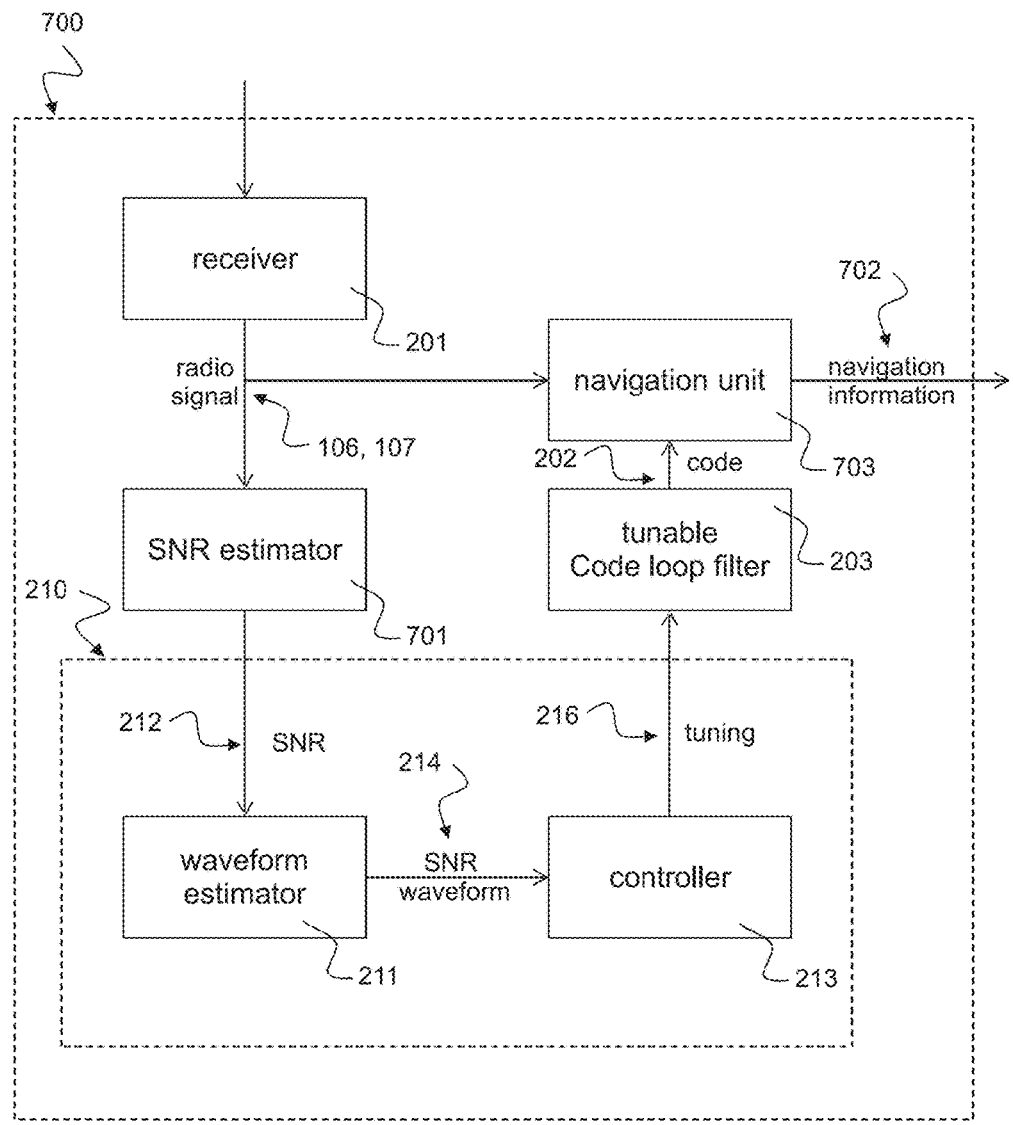
FIG. 7 is a block diagram of a GNSS device 700 including a control device 210 for compensating misadjustment of the GNSS device 700 according to the disclosure.

FIG. 7 is a block diagram of a GNSS device 700 including a control device 210 for compensating misadjustment of the GNSS device 700 according to the disclosure. The GNSS device 700 may represent a specific implementation of the GNSS device 200 described above with respect to FIG. 2.

The (portable) GNSS device 700 includes a GNSS receiver 201, e.g. a module as described above with respect to FIG. 2, configured to receive a radio signal 106, 107 from a plurality of satellite vehicles. The GNSS device 700 includes a navigation unit 703 configured to provide navigation information 702 based on navigation data encoded in the received radio signal 106, 107. The GNSS device 700 includes a tunable code loop filter 203, e.g. a module as described above with respect to FIG. 2, configured to estimate a code encoding the navigation data based on the received radio signal 106, 107. The GNSS device 700 includes a signal-to-noise ratio (SNR) estimator 701 configured to estimate an SNR 212 of the received radio signal 106, 107. The GNSS device 700 includes a waveform estimator 211, e.g. a module as described above with respect to FIG. 2, configured to estimate an SNR waveform 214 based on the estimated SNR 212 of the radio signal 106, 107. The GNSS device 700 includes a controller 213, e.g. a module as described above with respect to FIG. 2, configured to tune the code loop filter 203 based on the estimated SNR waveform 214 to compensate for misadjustment of the code loop filter 203 due to movement of the GNSS device 700.

The waveform estimator 211 may be configured to estimate the SNR waveform 214 based on determining a cycle time and an amplitude of the SNR 212. The waveform estimator 211 may be configured to determine the cycle time and the amplitude of the SNR 212 based on a time series of the SNR 212. The waveform estimator 211 may be configured to determine the cycle time and the amplitude of the SNR based on Kalman filtering and/or based on Short Term Fourier filtering. The GNSS device 700 may include a user profile detector, e.g. a module as described above with respect to FIG. 3, configured to detect a user profile of a user of the GNSS device 700 based on the estimated SNR waveform 214.

The devices and systems described in this disclosure may be implemented as Digital Signal Processors (DSP), microcontrollers or any other side-processor or hardware circuit on a chip or an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods described above and the computing blocks described above. Such a computer program product may include a readable storage medium storing program code thereon for use by a processor, the program code comprising instructions for performing the method or the computing blocks as described above.

EXAMPLES

The following examples pertain to further embodiments. Example 1 is a control device for compensating misadjustment of a tunable code loop filter of a portable global navigation satellite system (GNSS) device due to movement of the GNSS device, the control device comprising: a waveform estimator configured to estimate a signal-to-noise ratio (SNR) waveform based on an SNR of a radio signal received by the GNSS device; and a controller configured to tune the code loop filter based on the estimated SNR waveform to compensate for misadjustment of the code loop filter due to movement of the GNSS device.

In Example 2, the subject matter of Example 1 can optionally include that the waveform estimator is configured to estimate the SNR waveform based on determining a cycle time and an amplitude of the SNR.

In Example 3, the subject matter of Example 2 can optionally include that the waveform estimator is configured to determine the cycle time and the amplitude of the SNR based on a time series of the SNR.

In Example 4, the subject matter of any one of Examples 2-3 can optionally include that the waveform estimator is configured to determine the cycle time and the amplitude of the SNR based on Kalman filtering.

In Example 5, the subject matter of any one of Examples 2-3 can optionally include that the waveform estimator is configured to determine the cycle time and the amplitude of the SNR based on Short Term Fourier filtering.

In Example 6, the subject matter of any one of Examples 2-5 can optionally include a user profile detector configured to detect a user profile of a user of the GNSS device based on the estimated SNR waveform.

In Example 7, the subject matter of Example 6 can optionally include that the user profile detector is configured to detect the user profile based on threshold detection of the estimated SNR waveform with respect to a set of given motion patterns, each one representing a different motion scenario of the user.

In Example 8, the subject matter of Example 7 can optionally include that the set of given motion patterns comprises patterns representing at least one of the following user motions of a pedestrian user of the GNSS device: running, walking, standing.

In Example 9, the subject matter of Example 8 can optionally include that the user profile detector is configured to detect the user profile based on threshold detection of the determined cycle time of the SNR with respect to a set of given arm swift durations representing the different user motions of the pedestrian user.

In Example 10, the subject matter of any one of Examples 6-9 can optionally include that the controller is configured to tune the code loop filter based on adjusting loop gain factors of the code loop filter.

In Example 11, the subject matter of Example 10 can optionally include that the loop gain factors comprise a first loop gain factor weighting a previous code result, a second loop gain factor weighting a current Doppler measurement value and a third loop gain factor weighting a current code result.

In Example 12, the subject matter of any one of Examples 10-11 can optionally include that the controller is configured to detect a low SNR interval if the SNR is below a predetermined threshold.

In Example 13, the subject matter of Example 12 can optionally include that the controller is configured to reduce the weighting of the third first loop gain factor with respect to a weighting of the first and second first loop gain factors if a low SNR interval is detected.

In Example 14, the subject matter of any one of Examples 12-13 can optionally include that the controller is configured to restrain the GNSS device from dropping a signal contribution of a satellite vehicle in the received radio signal and to keep the GNSS device perform tracking via dead reckoning if a low SNR interval is detected.

In Example 15, the subject matter of any one of Examples 12-14 can optionally include that the controller is configured to restrain the GNSS device from incoherent integration of the radio signal if a low SNR interval is detected.

In Example 16, the subject matter of any one of Examples 12-15 can optionally include that the controller is configured to adjust the first loop gain factor versus the second loop gain factor in accordance with the detected user profile if a low SNR interval is detected.

Example 17 is a method for compensating misadjustment of a tunable code loop filter of a portable global navigation satellite system (GNSS) device due to movement of the GNSS device, the method comprising: estimating a signal-to-noise ratio (SNR) waveform based on an SNR of a radio signal received by the GNSS device; and tuning the code loop filter based on the estimated SNR waveform to compensate for misadjustment of the code loop filter due to movement of the GNSS device.

In Example 18, the subject matter of Examples 17 can optionally include estimating the SNR waveform based on determining a cycle time and an amplitude of the SNR.

In Example 19, the subject matter of Example 18 can optionally include determining the cycle time and the amplitude of the SNR based on a time series of the SNR.

In Example 20, the subject matter of any one of Examples 18-19 can optionally include determining the cycle time and the amplitude of the SNR based on Kalman filtering.

In Example 21, the subject matter of any one of Examples 18-19 can optionally include determining the cycle time and the amplitude of the SNR based on Short Term Fourier filtering.

In Example 22, the subject matter of any one of Examples 18-21 can optionally include detecting a user profile of a user of the GNSS device based on the estimated SNR waveform.

In Example 23, the subject matter of Example 22 can optionally include detecting the user profile based on threshold detection of the estimated SNR waveform with respect to a set of given motion patterns, each one representing a different motion scenario of the user.

In Example 24, the subject matter of Example 23 can optionally include that the set of given motion patterns comprises patterns representing at least one of the following user motions of a pedestrian user of the GNSS device: running, walking, standing.

In Example 25, the subject matter of Example 24 can optionally include detecting the user profile based on threshold detection of the determined cycle time of the SNR with respect to a set of given arm swift durations representing the different user motions of the pedestrian user.

In Example 26, the subject matter of any one of Examples 22-25 can optionally include tuning the code loop filter based on adjusting loop gain factors of the code loop filter.

In Example 27, the subject matter of Example 26 can optionally include that the loop gain factors comprise a first loop gain factor weighting a previous code result, a second loop gain factor weighting a current Doppler measurement value and a third loop gain factor weighting a current code result.

In Example 28, the subject matter of any one of Examples 26-27 can optionally include detecting a low SNR interval if the SNR is below a predetermined threshold.

In Example 29, the subject matter of Example 28 can optionally include reducing the weighting of the third first loop gain factor with respect to a weighting of the first and second first loop gain factors if a low SNR interval is detected.

In Example 30, the subject matter of any one of Examples 28-29 can optionally include restraining the GNSS device from dropping a signal contribution of a satellite vehicle in the received radio signal and keeping the GNSS device to perform tracking via dead reckoning if a low SNR interval is detected.

In Example 31, the subject matter of any one of Examples 28-30 can optionally include restraining the GNSS device from incoherent integration of the radio signal if a low SNR interval is detected.

In Example 32, the subject matter of any one of Examples 28-31 can optionally include adjusting the first loop gain factor versus the second loop gain factor in accordance with the detected user profile if a low SNR interval is detected.

Example 33 is a portable global navigation satellite system (GNSS) device, comprising: a GNSS receiver configured to receive a radio signal from a plurality of satellite vehicles; a navigation unit configured to provide navigation information based on navigation data encoded in the received radio signal; a code loop filter configured to estimate a code encoding the navigation data based on the received radio signal; a signal-to-noise ratio (SNR) estimator configured to estimate an SNR of the received radio signal; a waveform estimator configured to estimate an SNR waveform based on the estimated SNR of the radio signal; and a controller configured to tune the code loop filter based on the estimated SNR waveform to compensate for misadjustment of the code loop filter due to movement of the GNSS device.

In Example 34, the subject matter of Example 33 can optionally include that the waveform estimator is configured to estimate the SNR waveform based on determining a cycle time and an amplitude of the SNR.

In Example 35, the subject matter of Example 34 can optionally include that the waveform estimator is configured to determine the cycle time and the amplitude of the SNR based on a time series of the SNR.

In Example 36, the subject matter of any one of Examples 34-35 can optionally include that the waveform estimator is configured to determine the cycle time and the amplitude of the SNR based on Kalman filtering.

In Example 37, the subject matter of any one of Examples 34-35 can optionally include that the waveform estimator is configured to determine the cycle time and the amplitude of the SNR based on Short Term Fourier filtering.

In Example 38, the subject matter of any one of Examples 34-37 can optionally include a user profile detector onfigured to detect a user profile of a user of the GNSS device based on the estimated SNR waveform.

Example 39 is a device for compensating misadjustment of a tunable code loop filter of a portable global navigation satellite system (GNSS) device due to movement of the GNSS device, the device comprising: means for estimating a signal-to-noise ratio (SNR) waveform based on an SNR of a radio signal received by the GNSS device; and means for tuning the code loop filter based on the estimated SNR waveform to compensate for misadjustment of the code loop filter due to movement of the GNSS device.

In Example 40, the subject matter of Example 39 can optionally include means for estimating the SNR waveform based on determining a cycle time and an amplitude of the SNR.

Example 41 is a system for compensating misadjustment of a tunable code loop filter of a portable global navigation satellite system (GNSS) device due to movement of the GNSS device, the system comprising: a waveform estimation subsystem configured to estimate a signal-to-noise ratio (SNR) waveform based on an SNR of a radio signal received by the GNSS device; and a control subsystem configured to tune the code loop filter based on the estimated SNR waveform to compensate for misadjustment of the code loop filter due to movement of the GNSS device.

In Example 42, the subject matter of Example 41 can optionally include that the waveform estimation subsystem is configured to estimate the SNR waveform based on a cycle time and an amplitude of the SNR.

Example 43 is a computer readable non-transitory medium on which computer instructions are stored which when executed by a computer causes the computer to perform the method of any one of Examples 17 to 32.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A control device for compensating misadjustment of a tunable code loop filter of a portable global navigation satellite system (GNSS) device due to movement of the GNSS device, the control device comprising:
a waveform estimator configured to estimate a signal-to-noise ratio (SNR) waveform based on an SNR of a radio signal received by the GNSS device; and
a controller configured to tune the code loop filter based on the estimated SNR waveform to compensate for misadjustment of the code loop filter due to movement of the GNSS device.

2. The control device of claim 1,
wherein the waveform estimator is configured to estimate the SNR waveform based on determining a cycle time and an amplitude of the SNR.

3. The control device of claim 2,
wherein the waveform estimator is configured to determine the cycle time and the amplitude of the SNR based on a time series of the SNR.

4. The control device of claim 2,
wherein the waveform estimator is configured to determine the cycle time and the amplitude of the SNR based on Kalman filtering.

5. The control device of claim 2,
wherein the waveform estimator is configured to determine the cycle time and the amplitude of the SNR based on Short Term Fourier filtering.

6. The control device of claim 2, further comprising:
a user profile detector configured to detect a user profile of a user of the GNSS device based on the estimated SNR waveform.

7. The control device of claim 6,
wherein the user profile detector is configured to detect the user profile based on threshold detection of the estimated SNR waveform with respect to a set of given motion patterns, each one representing a different motion scenario of the user.

8. The control device of claim 7,
wherein the set of given motion patterns comprises patterns representing at least one of the following user motions of a pedestrian user of the GNSS device: running, walking, standing.

9. The control device of claim 8,
wherein the user profile detector is configured to detect the user profile based on threshold detection of the determined cycle time of the SNR with respect to a set of given arm swift durations representing the different user motions of the pedestrian user.

10. The control device of claim 6,
wherein the controller is configured to tune the code loop filter based on adjusting loop gain factors of the code loop filter.

11. The control device of claim 10,
wherein the loop gain factors comprise a first loop gain factor weighting a previous code result, a second loop gain factor weighting a current Doppler measurement value and a third loop gain factor weighting a current code result.

12. The control device of claim 10,
wherein the controller is configured to detect a low SNR interval if the SNR is below a predetermined threshold.

13. The control device of claim 12,
wherein the controller is configured to reduce the weighting of the third first loop gain factor with respect to a weighting of the first and second first loop gain factors if a low SNR interval is detected.

14. The control device of claim 12,
wherein the controller is configured to restrain the GNSS device from dropping a signal contribution of a satellite vehicle in the received radio signal and to keep the GNSS device perform tracking via dead reckoning if a low SNR interval is detected.

15. The control device of claim 12,
wherein the controller is configured to restrain the GNSS device from incoherent integration of the radio signal if a low SNR interval is detected.

16. The control device of claim 12,
wherein the controller is configured to adjust the first loop gain factor versus the second loop gain factor in accordance with the detected user profile if a low SNR interval is detected.

17. A method for compensating misadjustment of a tunable code loop filter of a portable global navigation satellite system (GNSS) device due to movement of the GNSS device, the method comprising:
estimating a signal-to-noise ratio (SNR) waveform based on an SNR of a radio signal received by the GNSS device; and
tuning the code loop filter based on the estimated SNR waveform to compensate for misadjustment of the code loop filter due to movement of the GNSS device.

18. The method of claim 17, comprising:
estimating the SNR waveform based on determining a cycle time and an amplitude of the SNR.

19. The method of claim 18, comprising:
determining the cycle time and the amplitude of the SNR based on a time series of the SNR.

20. The method of claim 18, comprising:
determining the cycle time and the amplitude of the SNR based on Kalman filtering.

21. The method of claim 18, comprising:
determining the cycle time and the amplitude of the SNR based on Short Term Fourier filtering.

22. The method of claim 18, further comprising:
detecting a user profile of a user of the GNSS device based on the estimated SNR waveform.

23. A portable global navigation satellite system (GNSS) device, comprising: a GNSS receiver configured to receive a radio signal from a plurality of satellite vehicles,
a navigation unit configured to provide navigation information based on navigation data encoded in the received radio signal;
a code loop filter configured to estimate a code encoding the navigation data based on the received radio signal;

a signal-to-noise ratio (SNR) estimator configured to estimate an SNR of the received radio signal;

a waveform estimator configured to estimate an SNR waveform based on the estimated SNR of the radio signal; and a controller configured to tune the code loop filter based on the estimated SNR waveform to compensate for misadjustment of the code loop filter due to movement of the GNSS device.

24. The GNSS device of claim 23, wherein the waveform estimator is configured to estimate the SNR waveform based on determining a cycle time and an amplitude of the SNR.

25. The GNSS device of claim 23, wherein the waveform estimator is configured to determine the cycle time and the amplitude of the SNR based on a time series of the SNR.

* * * * *